(12) United States Patent
Bergin

(10) Patent No.: US 10,696,129 B2
(45) Date of Patent: Jun. 30, 2020

(54) METHOD AND SYSTEM FOR REMOTE CONTROL OF A MOBILE CLIMATE CONTROL SYSTEM

(71) Applicant: Dometic Sweden AB, Solna (SE)

(72) Inventor: Bryan B. Bergin, Granger, IN (US)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 15/821,280

(22) Filed: Nov. 22, 2017

(65) Prior Publication Data

US 2018/0147913 A1  May 31, 2018

Related U.S. Application Data

(60) Provisional application No. 62/426,551, filed on Nov. 27, 2016.

(51) Int. Cl.
| | |
|---|---|
| *B60H 1/00* | (2006.01) |
| *G05B 15/02* | (2006.01) |
| *H04M 1/725* | (2006.01) |
| *F24F 11/56* | (2018.01) |

(52) U.S. Cl.
CPC ..... *B60H 1/00657* (2013.01); *B60H 1/00364* (2013.01); *B60H 1/00985* (2013.01); *G05B 15/02* (2013.01); *H04M 1/7253* (2013.01); *H04M 1/72533* (2013.01); *F24F 11/56* (2018.01); *G05B 2219/25167* (2013.01); *G05B 2219/2614* (2013.01)

(58) Field of Classification Search
CPC .............. B60H 1/00778; B60H 1/00771
See application file for complete search history.

(56) References Cited

U.S. PATENT DOCUMENTS

| | | |
|---|---|---|
| D738,355 S | 9/2015 | Smith et al. |
| D756,333 S | 5/2016 | Smith et al. |
| D757,691 S | 5/2016 | Smith et al. |
| D761,232 S | 7/2016 | Smith et al. |
| D766,217 S | 9/2016 | Smith et al. |
| 9,975,400 B2 * | 5/2018 | Farooq .............. B60H 1/00778 |
| D823,265 S | 7/2018 | Meda et al. |

(Continued)

FOREIGN PATENT DOCUMENTS

| | | |
|---|---|---|
| AU | 2017364256 A1 | 6/2019 |
| DE | 112017005541 T5 | 8/2019 |
| WO | 2018096127 A1 | 5/2018 |

OTHER PUBLICATIONS

European Patent Office, International Search Report and Written Opinion for PCT/EP2017/080431 dated Mar. 14, 2018, 14 pages.

(Continued)

*Primary Examiner* — Qutbuddin Ghulamali
(74) *Attorney, Agent, or Firm* — Middleton Reutlinger

(57) ABSTRACT

A method and system for remotely controlling a mobile climate control system for a vehicle is provided. The method allows for remote connection of a smart device to a mobile climate control system. The mobile climate control system may comprise a single HVAC system and thermostat or may comprise multiple HVAC systems and thermostats which provide multi-zone climate control for a vehicle, such as for non-limiting example, a recreational vehicle (RV). In some other embodiments, the system may comprise multiple HVACs and a single thermostat.

34 Claims, 11 Drawing Sheets

(56) References Cited

U.S. PATENT DOCUMENTS

| | | |
|---|---|---|
| 2008/0299961 A1 | 12/2008 | Muller et al. |
| 2011/0061414 A1* | 3/2011 | McAllister, II .... B60H 1/00371 62/244 |
| 2013/0151018 A1* | 6/2013 | Bias .................. F24F 11/30 700/276 |
| 2013/0183042 A1* | 7/2013 | Knapp ................ G08C 23/04 398/106 |
| 2014/0262130 A1 | 9/2014 | Yenni et al. |
| 2016/0040903 A1* | 2/2016 | Emmons ............ H04L 67/1078 700/278 |
| 2016/0193895 A1 | 7/2016 | Aich et al. |
| 2017/0036511 A1* | 2/2017 | Lee .................... B60H 1/00771 |
| 2018/0147913 A1* | 5/2018 | Bergin .............. B60H 1/00364 |

OTHER PUBLICATIONS nest.com, Google's Nest Learning Thermostat, Nov. 24, 2016, Retrieved from Internet Wayback Machine on Sep. 11, 2018, 4 pages. (https://bgr.com/2016/11/24/nest-thermostat-black-friday-2016-deal/).

Honeywell, Honeywell Lyric Round Wi-Fi Thermostat, RCH9310WF (Second Generation), Mar. 11, 2016, Retrieved from Internet Wayback Machine on Sep. 11, 2018, 3 pages. (https://www.honeywellstore.com/store/products/lyric-thermostat-wifi-smart-control-RCH9310WF.htm).

International Preliminary Report on Patentability for International Application No. PCT/EP2017/080431, dated May 28, 2019.

U.S. Appl. No. 62/426,551 entitled "Method and System for Remote Control of a Mobile Climate Control System" filed Nov. 27, 2016.

\* cited by examiner

METHOD AND SYSTEM FOR REMOTE CONTROL OF A MOBILE CLIMATE CONTROL SYSTEM

CLAIM TO PRIORITY

This non-provisional patent application claims priority to and benefit of, under 35 U.S.C. § 119(e), U.S. Provisional Patent Application Ser. No. 62/426,551, filed Nov. 27, 2016 and titled "Method And System For Remote Control Of A Mobile Climate Control System", all of which is incorporated by reference herein.

BACKGROUND

Field of the Invention

Present embodiments relate to a method and system for remotely controlling a mobile climate control system. More specifically, present embodiments relate to, without limitation, a method and system for remotely controlling a mobile climate control system in a vehicle, for example a recreational vehicle (RV).

Description of the Related Art

Various vehicles utilize climate control systems which are roof or wall mounted on the vehicle and operate through the wall or roof of the vehicle to heat or cool an interior. These may function solely, additionally, alternatively and/or separate of a vehicle climate control system which is typically controlled in-dash. These secondary systems are often required because of capacity limitations of the built-in climate control system and the related inability to manage the climate of the entirety of a large truck with sleeper for example, RV, boat or large vehicle. Similarly, the climate control is spread across the vehicle to improve performance.

However, these vehicles generally utilize a separate thermostat to control and input changes to the roof or wall mounted external climate control systems. Further, in vehicles having multiple climate control systems beyond an in-dash system, there are generally a corresponding multiple number of thermostats which have to be set and/or adjusted at any given period of time. It would be desirable to control the system from one location and with a single controller rather having to move to the various locations and adjust each thermostat independently.

It would also be desirable however, to not lose the independent adjustability of each climate control system, for example, HVAC mounted on the vehicle.

State of the art mobile HVAC systems do not allow for remote connection of all of the thermostats in a mobile climate control system. Still further, remote connections in fixed HVACs, such as homes and commercial structures, requires an intermediary communication systems such as a Wi-Fi standard system. However, in mobile operations, there may be difficulty in connecting via Wi-Fi because such would require data plans solely for the vehicle to connect to provide the Wi-Fi connection for the vehicle. This is cost prohibitive and undesirable. Further still, the Wi-Fi also requires an intermediary communication system between the climate control system and any communication device. This means additional devices would be required such as a modem with internet access as well as a router to connect to the various devices.

It would be desirable to overcome these and other difficulties of known systems to improve communication and control of one or more climate control devices which are mounted for mobile operation and which define a climate control system.

Still further it would be desirable to provide a method for controlling the climate control system in a remote manner so that one or more climate control setting may be made and/or adjusted without need to move to each separate thermostat.

The information included in this Background section of the specification, including any references cited herein and any description or discussion thereof, is included for technical reference purposes only and is not to be regarded subject matter by which the scope of the invention is to be bound.

SUMMARY

The present application discloses one or more features recited in the appended claims and/or the following features which, alone or in any combination, may comprise patentable subject matter.

Present embodiments are directed to a method and system for remote control of a mobile climate control system. The method allows for direct connection of a smart device, such as a smart phone or smart pad directly to a thermostat of the of the climate control system. The smart device includes an application which confirms the communication connection and emulates a thermostat of the mobile climate control system. The communication connection allows for remote control of the mobile climate control system from inside or outside of the vehicle. The specifications further direct to the system for allowing the control of the mobile climate control system.

In some embodiments, a method of controlling a mobile climate control system comprises the steps of powering on a smart device having an application for controlling the mobile climate control system, the mobile climate control system for heating or cooling a vehicle. Starting the application on the smart device, the smart device having a Bluetooth transceiver. Starting communication capability of the Bluetooth transceiver of the smart device and starting the application of the smart device. Connecting the smart device to a thermostat which is in communication with the mobile climate control system, the thermostat having a thermostat Bluetooth transceiver. Providing at least one screen on the application which substantially emulates a control screen of the thermostat, and, setting at least one control characteristic on the at least one screen on the smart device.

This method and system, and other embodiments of technology disclosed herein may each optionally include one or more of the following features.

In some embodiments, the connecting may include the step of selecting at least one manufacturer-specific mobile climate control system.

In some embodiments, the connecting may comprise the step of eliminating non-manufacturer specific Bluetooth connections.

In some embodiments, the connecting may be a direct connection between the smart device and the transceiver of the thermostat without an intermediary communication device.

In some embodiments, the connecting may occur from the application.

In some embodiments, the setting may include powering on or off the mobile climate control system.

In some embodiments, the setting may include selecting one of air-conditioning or heating.

In some embodiments, the setting may include selecting of a fan speed or an automatic setting.

In some embodiments, the setting may include selecting a set temperature.

In some embodiments, the method may further comprise displaying a temperature of the vehicle interior wherein the thermostat is located.

In some embodiments, the method may further comprise measuring said temperature of the vehicle interior at the thermostat and displaying the temperature on the application of the smart device.

In some embodiments, the method may further comprise loading a splash screen when the application starts.

In some embodiments, the method further comprise providing a virtual menu button on the at least one screen which substantially emulates a control screen of the thermostat.

In some embodiments, the method may further comprise displaying a name of the thermostat on the at least one screen which substantially emulates a control screen of the thermostat.

In some embodiments, the method may further comprise providing multiple virtual buttons on the at least one screen which substantially emulates a control screen of the thermostat.

In some embodiments, one of the multiple buttons may be a mode button to change between heating, air-conditioning, fan operation and an off condition.

In some embodiments, the method may further comprise displaying an instruction screen which prompts a user to cycle the thermostat to connect the smart device and the thermostat.

In some embodiments, the application may provide a screen to manage multiple Bluetooth connected thermostats.

In some embodiments, the screen to manage multiple Bluetooth connected thermostats application may provide a virtual button for each detected thermostat.

In some embodiments, a method of controlling a mobile climate control system may comprise the steps of receiving an input on an application of a smart device to establish a connection between the smart device and the mobile climate control system of a vehicle, establishing a Bluetooth communication connection, within the application, between the mobile climate control system and the smart device, providing a smart device screen which emulates an appearance of a thermostat of the mobile climate control system, receiving a user input at the smart device screen which emulates an appearance of a thermostat, and, sending a signal corresponding to the input to the thermostat to change a control characteristic.

This method and system, and other embodiments of technology disclosed herein may each optionally include one or more of the following features.

In some embodiments, the method may further comprise eliminating non-manufacturer specific selections from a Bluetooth pairing screen.

In some embodiments, the establishing a connection may be with a Bluetooth transceiver in the thermostat.

In some embodiments, the thermostat may communicate with a relay of the mobile climate control system.

In some embodiments, the method may further comprising displaying a temperature setting and a mode setting.

In some embodiments, the user input may be one of mode setting, or temperature set point.

In some embodiments, the mode setting may be one of air-conditioning, heat, fan operation or an off condition.

In some embodiments, the method may further comprise receiving an input to disconnect the Bluetooth connection.

In some embodiments, the method may further comprise displaying a splash screen.

In some embodiments, the method may determine if a default known thermostat is available for connection.

In some embodiments, the method may further comprise displaying a Bluetooth pairing screen.

In some embodiments, the method may determine if the establishing a connection is successful.

In some embodiments, the method may further comprise returning to the Bluetooth pairing screen if the connection is unsuccessful.

In some embodiments, the method may further comprise displaying the smart device screen which emulates an appearance of a thermostat of the mobile climate control system, if the connection is successful.

In some embodiments, the method may further comprising the step of receiving input to label one or more mobile climate control systems.

According to some embodiments, a system of controlling a mobile climate control comprises an RV, a mobile air conditioner which heats or cools the RV, a thermostat disposed in the RV and in communication with the mobile air conditioner, a Bluetooth receiver disposed in the thermostat, a smart device in wireless Bluetooth communication with the Bluetooth receiver of the thermostat, wherein the smart device may be utilized to control and change settings of the thermostat.

Other implementations may include one or more non-transitory computer readable storage media storing instructions executable by a processor (or other controller(s)) to perform a method such as one or more of the methods described above. Yet another implementation may include a system including memory and one or more processors (or other controller(s)) operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

All of the above outlined features are to be understood as exemplary only and many more features and objectives of a method of controlling a mobile climate control system and may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, a method of controlling a mobile climate control system will now be described by way of examples. These embodiments are not to limit the scope of the claims as other methods and systems will become apparent to one having ordinary skill in the art upon reading the instant description. Non-limiting examples of the present embodiments are shown in figures wherein:

DETAILED DESCRIPTION

Figure 1:
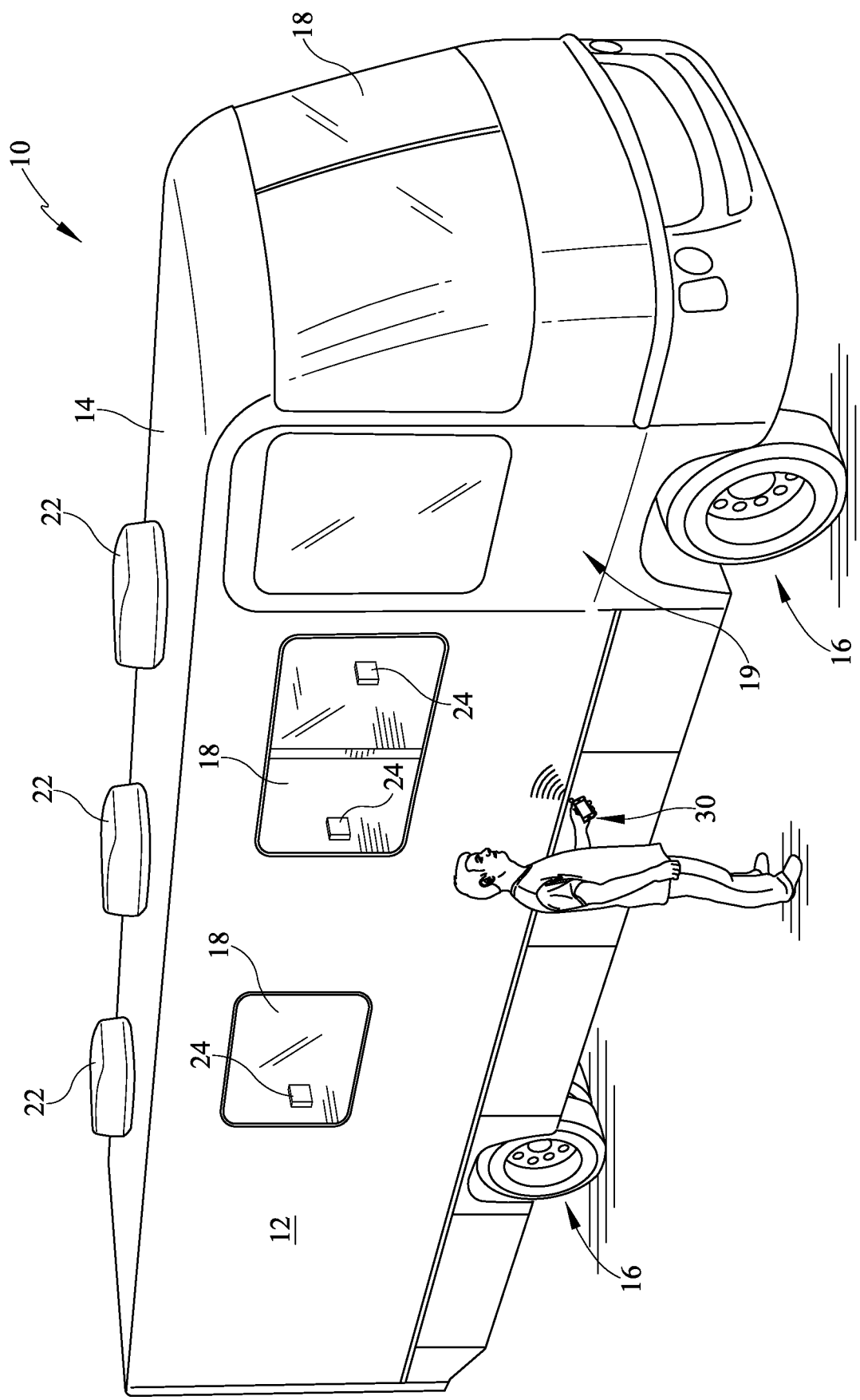
FIG. 1 is a perspective view of an RV with a mobile climate system, which may be remotely controlled.

It is to be understood that the method and system of controlling a mobile climate control system is not limited in its application to the details of construction and the arrangement of components set forth in the following description or illustrated in the drawings. The embodiments described and shown are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-11 various embodiments related to a method and system for remotely controlling a mobile climate control system is depicted and taught. The method allows for remote connection of a smart device to a mobile climate control system. The mobile climate control system may comprise a single HVAC system and thermostat or may comprise multiple HVAC systems and thermostats which provide multi-zone climate control for a vehicle, such as for non-limiting example, a recreational vehicle (RV). In some other embodiments, the system may comprise multiple HVACs and a single thermostat. Further, the recreational vehicle is not limiting and the method and system may also be utilized with trucks which have separate one or more HVAC systems beyond those which are normally built into the cab and controlled by dashboard controls.

Referring now to FIG. 1, a perspective view of a vehicle 10 is shown. The vehicle 10, in the depicted embodiment, may be a recreational vehicle. However, various vehicle types may be utilized within the spirit of the present embodiments. For example, other trucks which may have one or more wall or roof mounted heating, ventilation and air conditioning systems (HVACs) may be utilized. Likewise, other vehicles may include marine vehicles, such as boats, which have roof or wall mounted heating, ventilation, air conditioning systems. The RV 10 includes a drive and transmission, not shown, as well as a sidewall 12 and a roof 14. The RV 10 also includes a plurality of wheel assemblies 16, which include tires. Two or more of the wheel assemblies 16 may be driven by the engine and transmission for movement of the RV 10. The RV 10 may include at least one window 18 and at least one door 19 for entry and exit through the sidewall 12 and into the RV 10.

It should be understood that although particular forms of vehicle are shown in some examples provided herein, the term RV is generic and may apply to other type of vehicles, both powered and non-powered (e.g., a non-powered tow-behind camper). One skilled in the art, having had the benefit of the present disclosure, should understand that system and methods described herein may be used with a variety of commercial vehicles, agricultural vehicles, horse trailers, and/or temporary structures such as those used at sports events (tailgating) and/or flea markets as well as marine vehicles, for example boats.

Figure 2:
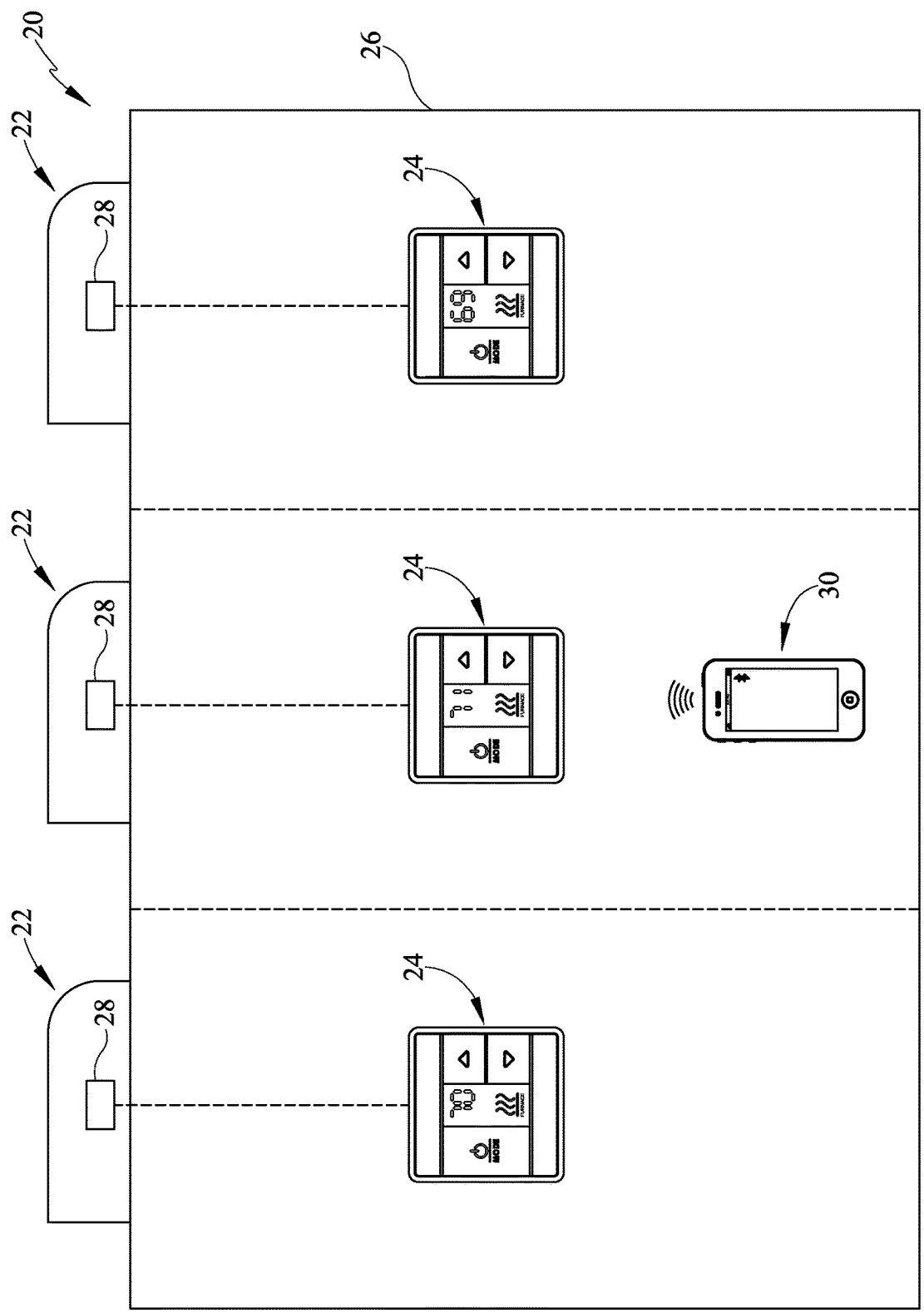
FIG. 2 is a schematic view of the mobile climate control system.

Along the roof 14 of the vehicle 10 are multiple HVAC systems 22 which define, in combination, a mobile climate control system 20 (FIG. 2). In some embodiments, the mobile climate control system 20 may be defined by a single HVAC system 22 or in some embodiments the climate control system may be defined by multiple systems as depicted and which may be dependent upon the size of the vehicle 10 being climate controlled and the cooling capacity of each of the one or more HVAC systems 22.

Figure 3:
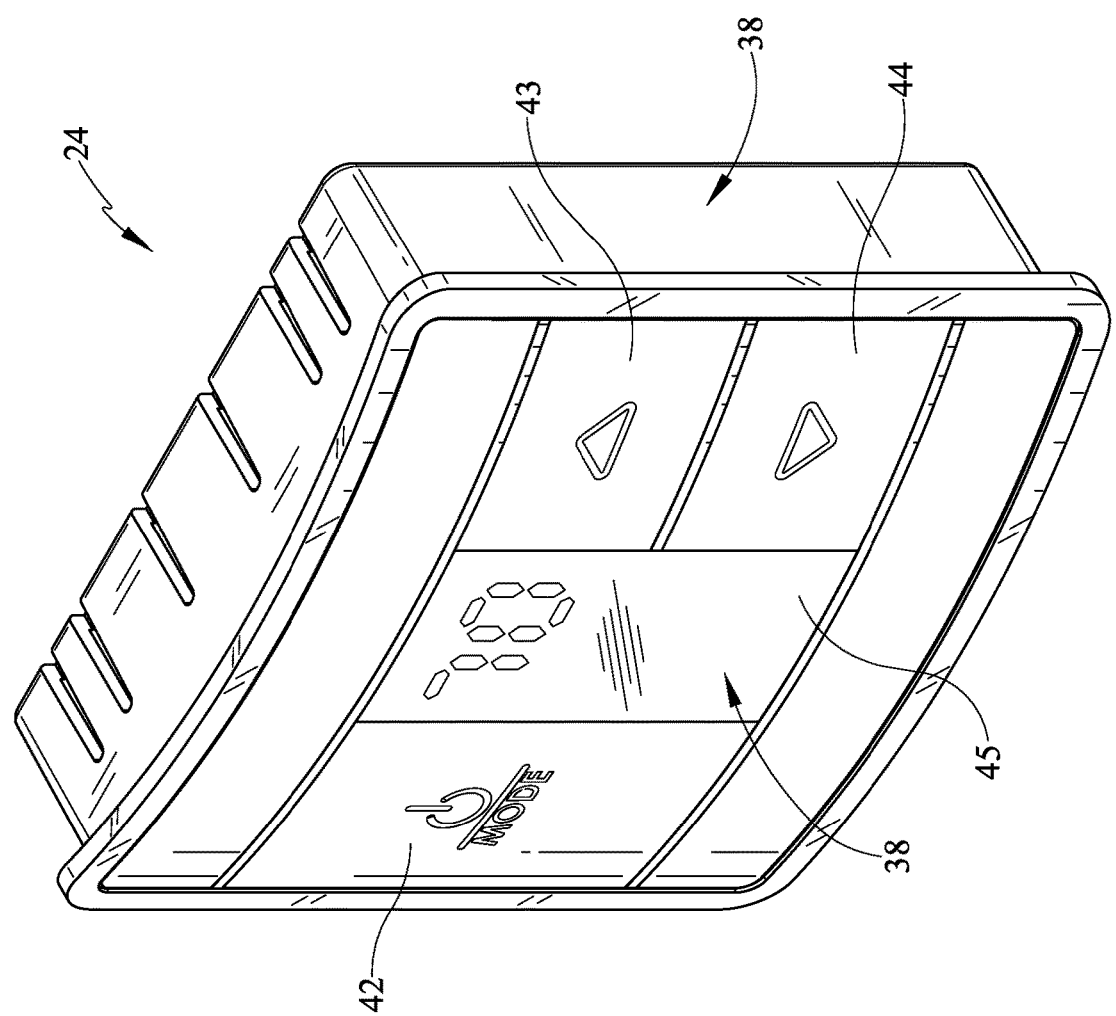
FIG. 3 is a front perspective view of one example of a thermostat.

In some embodiments, the HVAC systems 22 may work in combination as a single system. That is, all of the HVACs may be set to one setting and controlled by a single thermostat 24. Alternatively, in other embodiments, the HVACs may be zoned for operation so as to heat and cool various zones or volumes of the vehicle 10 at independent temperature settings, rather than a single setting where all HVACs run at the same mode and same set temperatures. In such alternative configuration, each of the HVAC systems 22 may comprise a thermostat 24 (FIG. 3). In the former configuration where the HVAC systems all work as one, a single thermostat 24 may be utilized. The instant embodiments will be described in a manner wherein each HVAC system 22 utilizes a separate thermostat 24 for zoned control of multiple HVACs to provide the mobile climate control system.

Referring now to FIG. 2, a schematic view of a mobile climate control system 20 is depicted. The mobile climate control system 20 comprises at least one HVAC system 22 and according to the depicted embodiment, comprises three HVAC systems 22.

The mobile climate control system 20 is shown positioned both within and exterior of a box 26 or volume. The box 26 represents any vehicle interior wherein it may be desired to control the climate by way of heat or air conditioning.

Further, within the box 26 there are partitions shown by way of broken line extending from the upper portion of the box 26 to the lower portion. These are provided to symbolize zones or partitions which may or may not be formed by walls within the vehicle 10 or alternatively, may merely be areas which are defined in space but not clearly delineated by a boundary structure. Thus, in the instant embodiment, there are three zones which are each serviced by an HVAC and which may be independently heated and cooled and the thermostats 24 each provide differing temperature settings, for example if different users appreciate either warmer or colder conditions in the zone in which they are located.

On the inside of the box 26 are three thermostats 24, each of which are in communication with a corresponding HVAC system 22. The thermostat 24 may be in either wired or wireless communication with a relay 28, which is in the HVAC system 22. Each thermostat 24 may be located on a wall (FIG. 1), as with the instant embodiment, or may be built into air distribution boxes or assemblies, which are positioned generally below the HVAC system 22 along the ceiling of the vehicle. The relay 28 may alternatively be manufactured in the thermostat 24 and provide control to start or stop one or more functions within the HVAC system 22, such as a compressor motor, fan motor, pump, or any combination thereof.

Each of the HVACs 22 may be powered by a battery bank comprising one or more batteries which may be charged by an alternator, or the HVACs 22 may be run from the alternator when the engine of the vehicle is operating. Further, the HVACs 22 may also be run by shore power connection, for example at a campground or other facility with such accommodations.

Within the box 26 is also a smart device 30. The smart device 30 allows for remote connection with each of the thermostats 24 and labeling with a distinct or discreet label each of the HVAC systems 22. In some embodiments, this may occur by way of labeling each thermostat 24 or in other embodiments, where a connection may be made to the HVAC.

The smart device 30 may be embodied by various types of smart phones or smart pads. For example, any of various types of Android based or iOS based phones or pads may be utilized. Still further, other devices which have Bluetooth connectivity may also be utilized such as laptops, notebooks, ultrabooks. For example Apple® or Windows® operating system pads, convertible devices may be utilized. Still further, Linux or other known software which may be utilized with devices having Bluetooth connectivity may all be utilized as a smart device for purpose of the instant embodiments.

Referring now to FIG. 3, a thermostat 24 is shown in front perspective view. The thermostat 24 includes a housing 38 and a screen 40 extending along the front portion of the housing 38. The screen 40 may be a capacitive touch screen which provides certain areas that may be utilized for input of modes, changes to operational parameters or characteristics or other features. For example, the screen 40 includes a first capacitive touch area 42 which defines a power and mode button so that the thermostat 24 may be powered on and cycled through various modes or powered off. Further, a second area 43 and a third area 44 provide input areas for increasing or decreasing, respectively, a set temperature, for example. In a fourth area 45, which is generally central to the screen 40, a set temperature may be displayed and may change due to the input at the second or third areas 43, 44. Still further, the fourth area 45 may also be utilized to indicate to a user which mode is being selected with the first area 42 or to display that the HVAC system 22 (FIG. 2) is turned off. Additionally, the fourth area 45 may also show the inside temperature where the thermostat is located. While the thermostat 24 is described as capacitive touch and has four areas for input or information, other input types may be utilized for the thermostat embodiments.

Further, the thermostat 24 has a Bluetooth transceiver which may send and receive data by way of a Bluetooth communication connection with the smart device 30. In the present embodiments, there are three thermostats 24, one for each of the HVACs 22.

Figure 4:
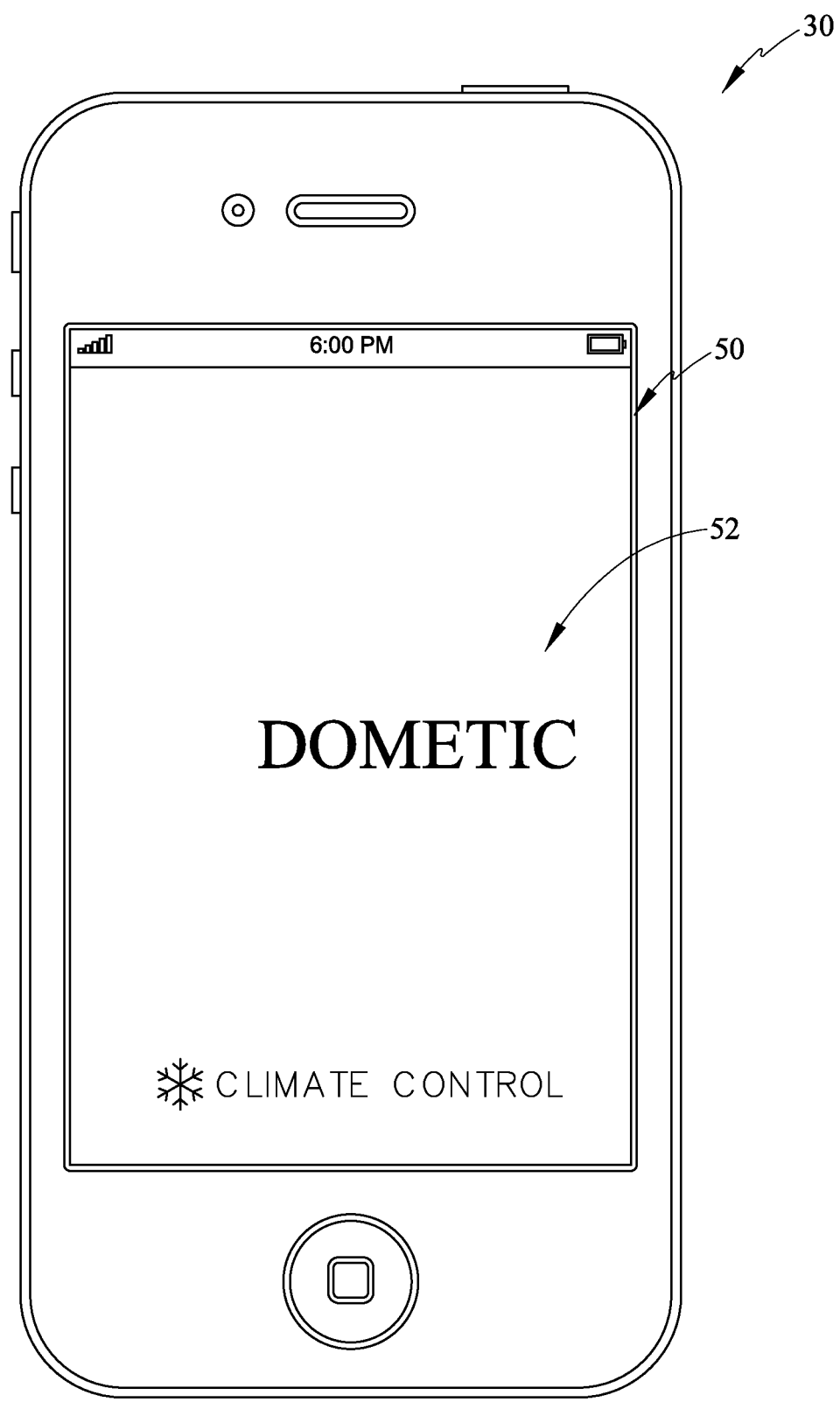
FIG. 4 is a front view of a smart device and an application at a splash or loading screen.

Referring now to FIG. 4, a front view of an embodiment of a smart device 30 is depicted. The smart device 30 may be a mobile computing device of a user such as, for example, a smart phone, a tablet, a laptop, a smart watch, smart glasses, etc. Computing or smart device 30 typically includes at least one processor which communicates with a number of peripheral devices via bus subsystem. These peripheral devices may include a storage subsystem, including, for example, a memory subsystem and a file storage subsystem, user interface input devices, user interface output devices, and a network interface subsystem. The input and output devices allow user interaction with computing device. Network interface subsystem provides an interface to outside networks and is coupled to corresponding interface devices in other devices.

User interface input devices may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device or onto a communication network. These may be external or integrated into the housing of the smart device 30.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from smart device 30 to the user or to another machine or computing device.

Storage subsystem stores programming and data constructs that provide the functionality of some or all of the modules described herein. For example, the storage subsystem may include the logic to perform one or more aspects of the methods described herein.

These software modules are generally executed by processor alone or in combination with other processors. Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem in the storage subsystem, or in other machines accessible by the processor(s).

Bus subsystem provides a mechanism for letting the various components and subsystems of computing device communicate with each other as intended. Although bus subsystem is shown schematically as a single bus, alternative implementations of the bus subsystem may use multiple busses.

Due to the ever-changing nature of computers and networks, the description of computing device is intended only as a specific example for purposes of illustrating some implementations. Many other configurations of computing device are possible having more or fewer components. The smart device 30 may also include at least a communication protocol and related hardware, for example Bluetooth communication to communication with the thermostat 24.

When loading an application 50 which provides for the methods described further herein, the application 50 provides a splash or loading screen 52 which is on while the application 50 loads and starts on the smart device 30. Specifically, the depicted embodiment shows a splash screen 52 which occurs during the operation of an application (or "app") 50, on the smart device 30. At this splash screen 52, a manufacturer name and logo may be shown, as well as, for non-limiting example at the lower portion of the screen 32, a business group or division which manufactures and/or sells the app may be provided. For example, in the instant method and system, the smart device 30 is utilized to provide remote control of a mobile climate control system 20 (FIG. 2). Accordingly, the splash screen 52 may include a name of a manufacturer, as well as an icon related to climate control. This splash screen 52 may be shown when the app 50 is initially downloaded and installed, as well as, or alternatively only, when the app 50 is started on the smart device 30.

Figure 5:
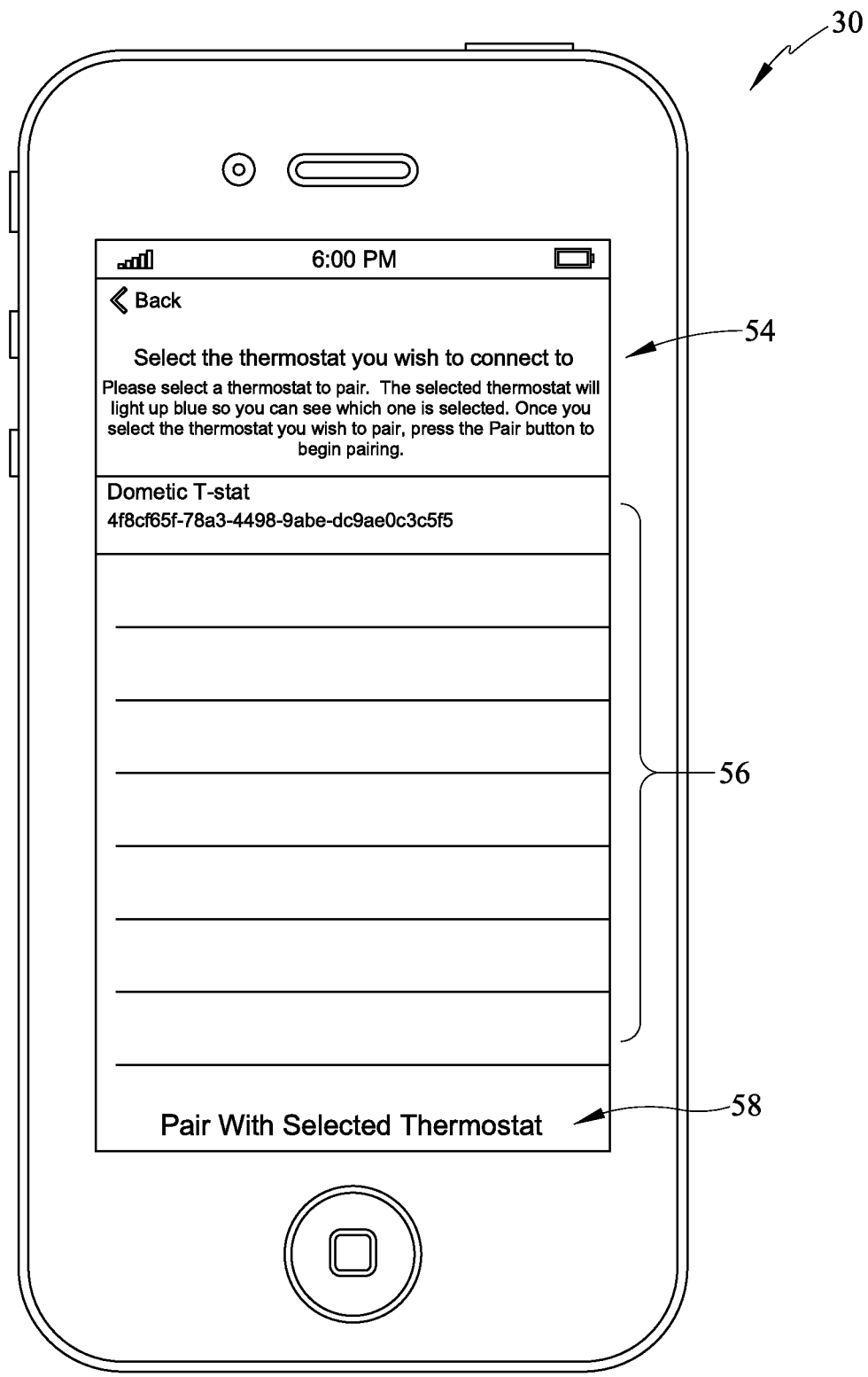
FIG. 5 is a second screen of the application to establish communication and allow for selection of one or more Bluetooth devices of a specific manufacturer.

Referring now to FIG. 5, a sample graphical user interface (GUI) screen is depicted following the splash screen of FIG. 4. In this embodiment, the application 50 may provide a pairing screen 54 for managing pairing of any Bluetooth devices. As described previously, the climate control system 20 may be defined by one or more HVACs 22. Each of the HVACs may be operated by a thermostat 24 which may be connected to the smart device 30.

In the example of FIG. 1, there are shown three HVACs 22. In such instance, the pairing screen 54 may show three different Bluetooth thermostats 24. In the depicted embodiment, for example and alternative embodiment from FIG. 1, the GUI screen 34 provides a manager for pairing and asks a user to select a detected Bluetooth device. A list 36 is created showing the number of thermostats available for connection.

In another improvement, while the smart device 30 the application 50 may detect multiple Bluetooth signals from any of various devices which may be located in the vicinity of the smart device 30, the instant application 50 may eliminate Bluetooth devices from this list 36 which are not manufactured by a specific manufacturer and/or are related to the application 50. For example, in the provided list, only specific HVAC systems from a desired manufacturer may appear on this list of Bluetooth compatible devices which may be selected. Since each of the thermostats 24 will have a transceiver for communication, there may be more than one selectable device, each having specific identifiers which allow the application 50 to eliminate those which are not related to the climate control system, such as other smart devices, or Bluetooth speakers, watches or the like. Thus, the thermostats 24 each have a Bluetooth transceiver for communication and accordingly, the screen 54 depicts manufacturer-specific devices, such as one thermostat 24 which may communicate with the application 50. Such thermostat 24 is shown in a list 56 and additional identifying text may be provided on the smart device 30 screen 54 for selection or, alternatively, a virtual button may be provided for selection, which allows for enablement of communication or pairing of the smart device 30 with the selected thermostat 24.

Additionally, the screen 34 may depict an area with text so that directions may be provided to the user for ease of operation, for example at the top of the screen 34. In any event, certain areas of text corresponding to the desired thermostat to initiate the connection process. In other embodiments, a separate or additional virtual button or area 58 may be engaged following selection of the desired thermostat from the list 58 to initiate communication between the selected thermostat 24 and the smart device 30.

Figure 6:
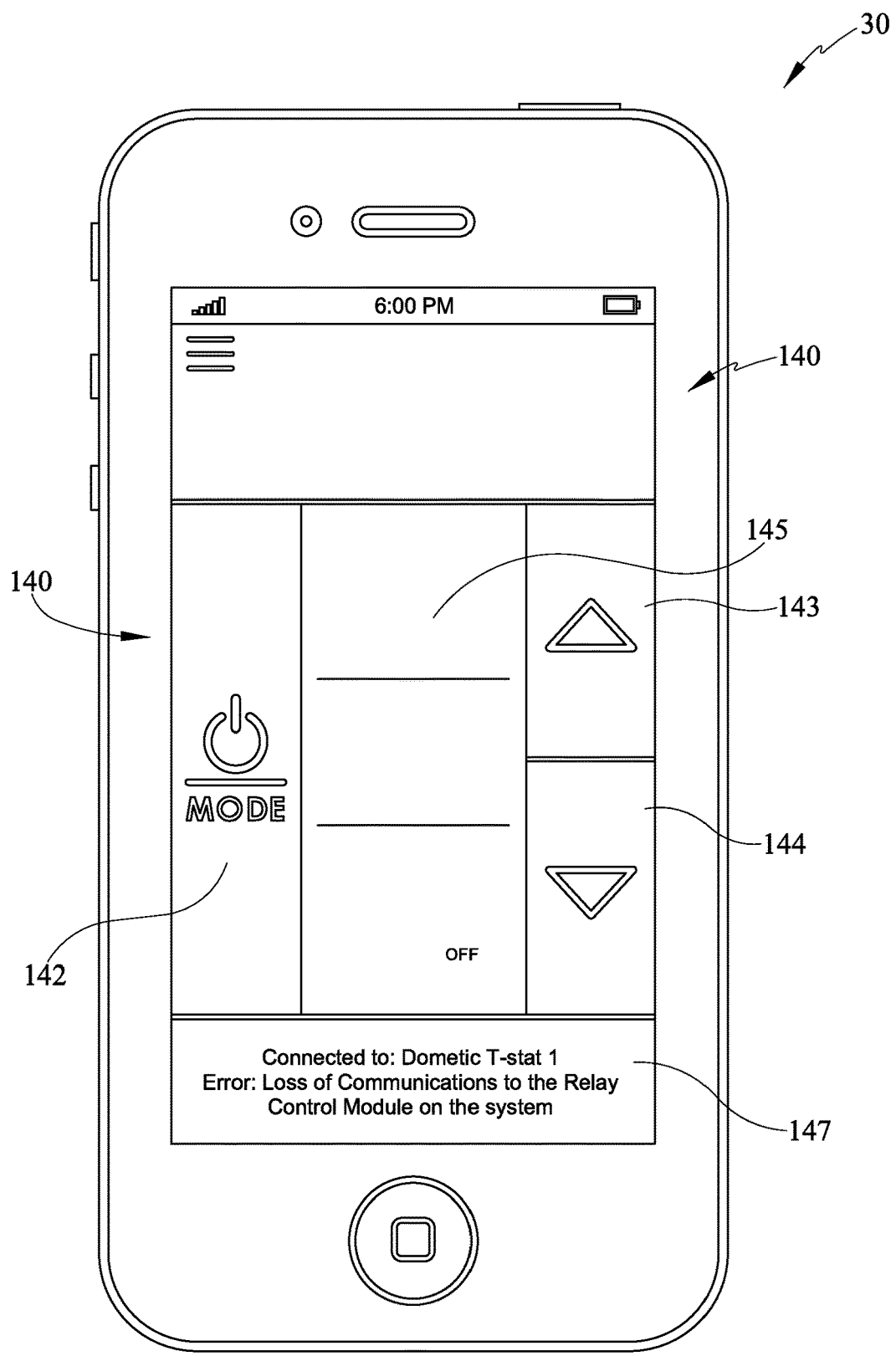
FIG. 6 is a first view of the smart device running the application and a graphical user interface which emulates a thermostat to aid in controlling the mobile climate control system.

Referring now to FIG. 6, the smart device 30 is shown with a screen 140 emulating the thermostat 24 (FIG. 3) screen 40 (FIG. 3). In this embodiment, the emulation screen or main screen 140 is depicted and looks substantially similar to the screen 40 of the thermostat 24. The screen 140 is available to the user through the application 50 once the Bluetooth communication is established between the smart device 30 and one of the at least one thermostats 24. Thus, once the communication is established, the user may utilize this screen 140 of the application 50 in order to vary the mode and various inputs for operating characteristics by way of the application 50. Such changes, when made on the application 50, may also appear on the thermostat 24 in real time in some embodiments.

In the depicted embodiment, the HVAC system 22 (FIG. 2) is shown in off position, as indicated in the area 145. In order to cycle through various modes, the first area 142 on the smart device 30 may be pressed, and includes a prompt to the user which indicates mode switching. This has the same effect as pressing the first area 42 (FIG. 3) of the thermostat 24. Likewise, the screen emulating the thermostat 24 also has second and third areas 143, 144. These areas correspond to the second and third areas 43, 44 of the thermostat 24 and provide for up or down input. Depending on the mode, the up/down arrow will have various effects on the HVAC system 22 (FIG. 2). Likewise, the application 50 has a fourth area 145 which, in the depicted embodiment, merely indicates that the HVAC system 22 is in an off status or condition.

Figure 7:
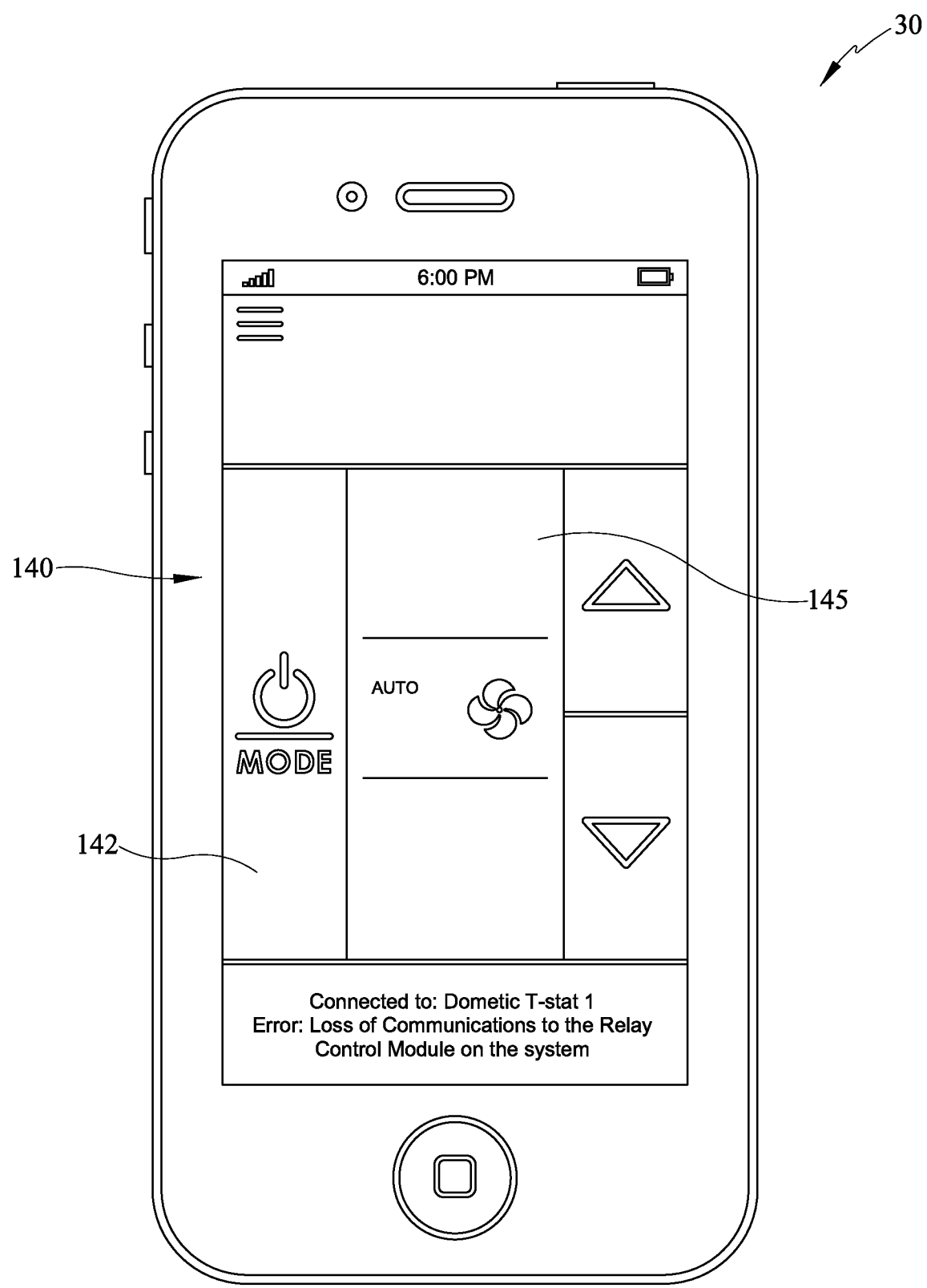
FIG. 7 is a second view of the application graphical user interface which emulates a thermostat shown in a different mode than that of FIG. 6.

Referring now to FIG. 7, a view of the application 50 and the screen 140, emulating the thermostat screen 40 (FIG. 3) is shown. The screen 140 is different from that of FIG. 6 due to the pressing of the mode virtual button in the first area 142, which cycles the HVAC system 22 (FIG. 2). The mode virtual button in the first area 142 of the application 50 is selected to change the mode from an off position to the fan mode. In this view, in the fourth area 145 a fan blade icon is depicted and the fan mode is shown in auto. Further, in this mode, the up or down buttons may be utilized to change from auto to a high speed or a low speed, for non-limiting example.

Figure 8:
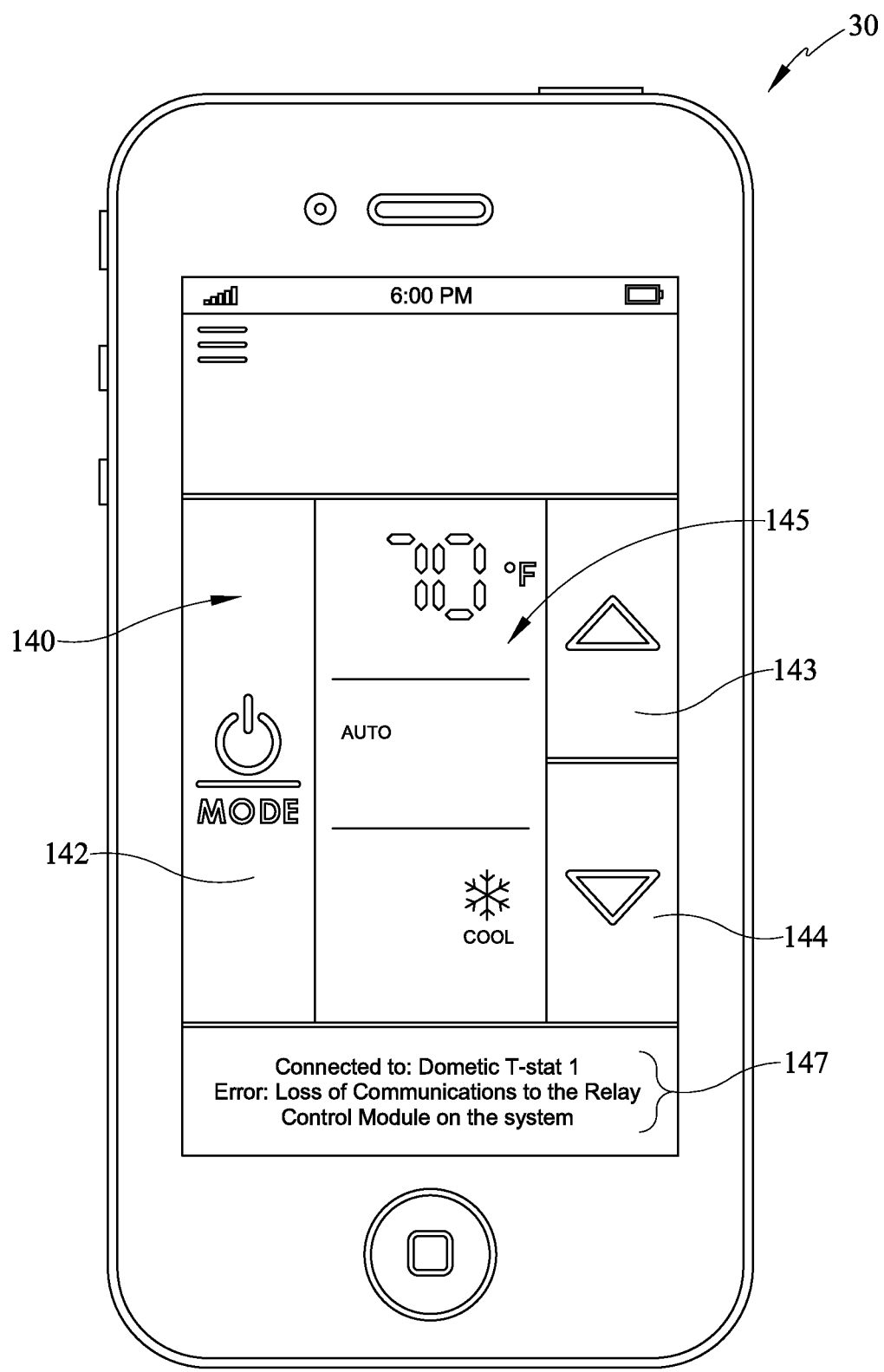
FIG. 8 is a third view of the application graphical user interface which emulates the thermostat in a third mode of operation.

Referring now to FIG. 8, a further view of the application 50 and the screen 140 emulating the thermostat screen 40 (FIG. 3) is shown. The mode virtual button in the first area 142 is selected to change the mode to a cooling mode. The cooling mode is depicted in the fourth area 145 with an icon related to the cooling mode and the set temperature is also depicted. The second and third areas 143, 144 may be depressed in order to change the set temperature in the cooling mode.

Further, at the bottom of the screen 140, there is a message area 147 which indicates that the smart device 30 is connected to a specific thermostat 24. The thermostat 24 may by labeled by a specific label or name. Further, any other messages which may be helpful to the user may be shown. For example, in the message area of screen 147, an error may be displayed if the thermostat loses communication with a relay 28 of the HVAC system 22, as depicted.

Figure 9:
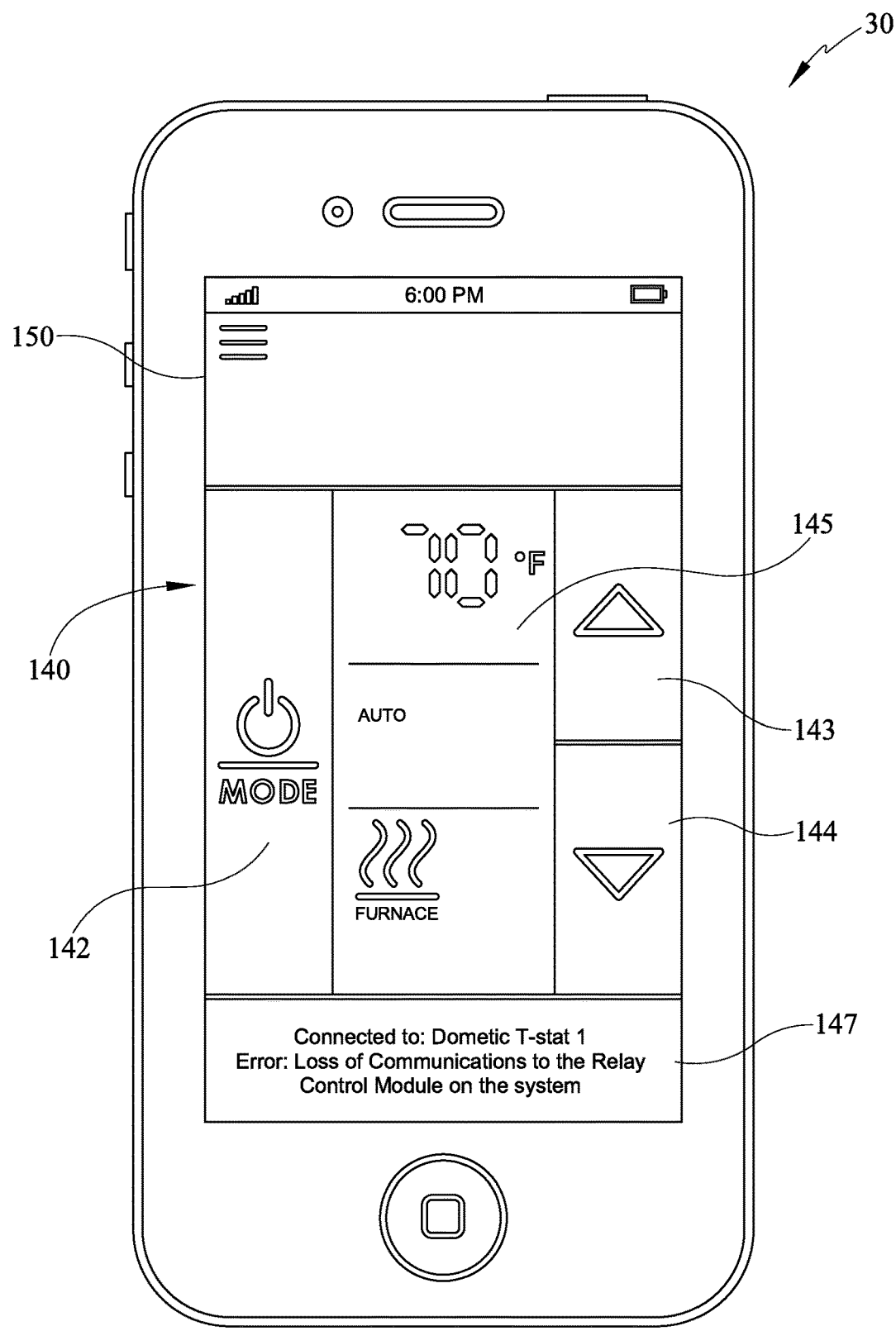
FIG. 9 is a fourth view of the application graphical user interface which emulates the thermostat in a fourth mode of operation

Referring now to FIG. 9, the mode virtual button or first area 142 has been depressed again to change from the cooling mode to a heating mode, as depicted by an icon in the fourth area 145 of screen 140. In this mode, a set temperature is again depicted in an upper portion of the fourth area 145. In this mode, the set temperature may be adjusted by using the up/down arrows of the second and third areas 143, 144. Still further, when these areas 143, 144 are depressed and the set temperature is changed on the application 50 of the smart device 30, the number also changes on the thermostat 24 (FIG. 3). Thus, the adjustment of the operating condition, characteristic or perimeter on the application 50 of the smart device 30 simultaneously changes such setting on the thermostat 24 in real time.

In either of these modes, the actual temperature may be displayed as well. For example, the actual temperature may be displayed on depressing of a button, or may be displayed upon some period of time passing once a mode selection is made or a set temperature is changed.

Figure 10:
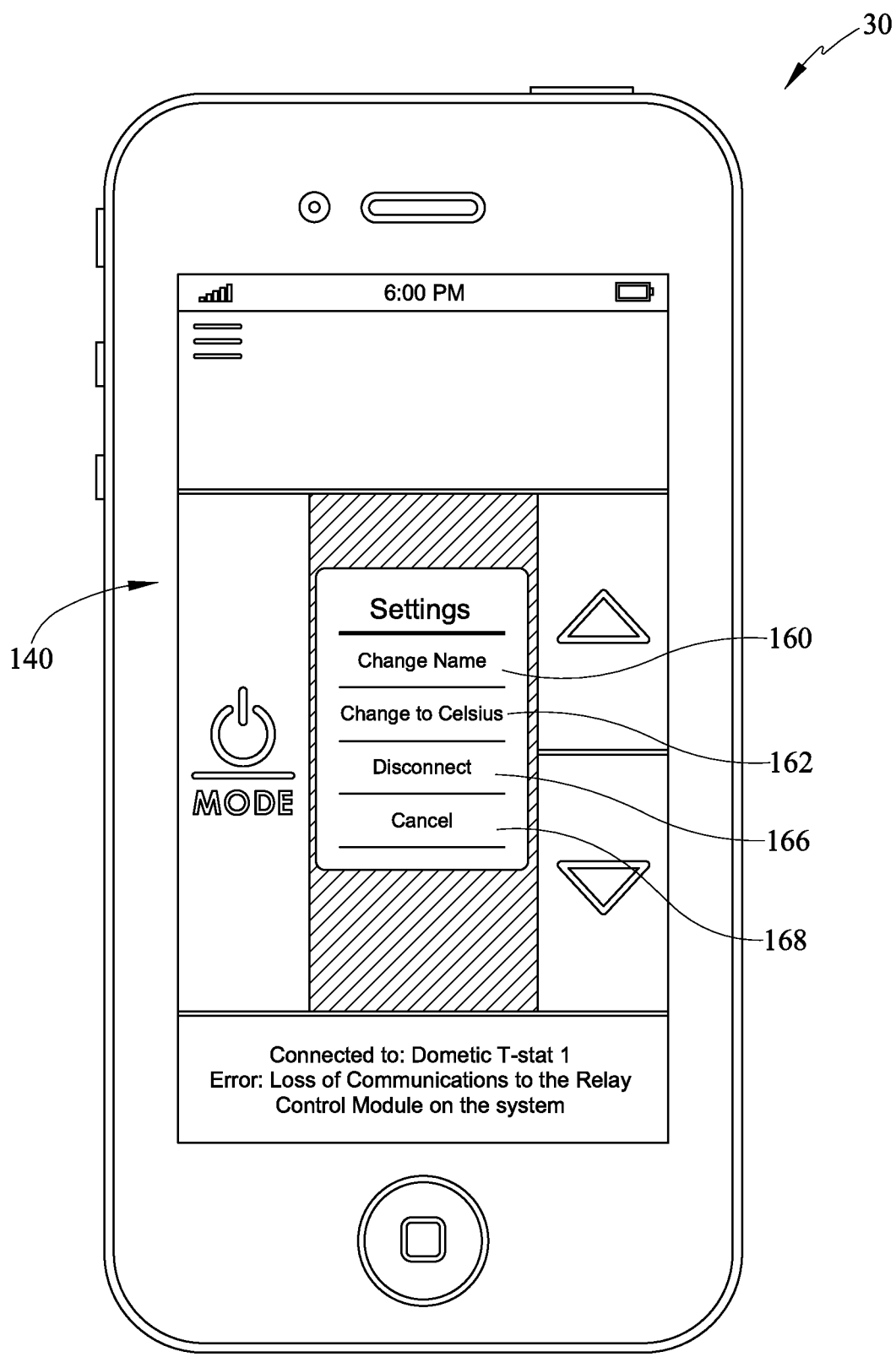
FIG. 10 is a view of the application screen which emulates the thermostat displaying a plurality of settings to vary the operation of the mobile climate control system; and, FIG. 11 is a flow chart showing one non-limiting method of operation.

Still further, any of these screens 140 which emulate the screen 40 of the thermostat 24, have a menu selection 150 generally shown in the depicted embodiments in the upper left corner of the emulated screen. When this area of the screen 140 is depressed, a plurality of settings may appear on the application 50 screen. As shown in FIG. 10, various functionalities may be provided in these menu settings. For example, in one embodiment, the name of the thermostat 24 may be changed by depressing the "change name" selection 160. This may allow each thermostat 24 to have a different name, for example, a thermostat 24 may be labeled as a kitchen area, dining room, bedroom, or the like, corresponding to areas of the RV. Other names may be provided and may be input at the discretion of the user. At a second menu selection 162, there may be a button to change from Fahrenheit to Celsius or vice versa. At a third selection button or area 166 there may be an option to disconnect the smart device 30 from the thermostat 24. Still further, there may be a "cancel" selection 168 which allows the user to exit from the settings menu. Other functionalities may be provided by these menu settings to aid or increase the functionality of the application 50 relative to the thermostat 24.

Figure 11:
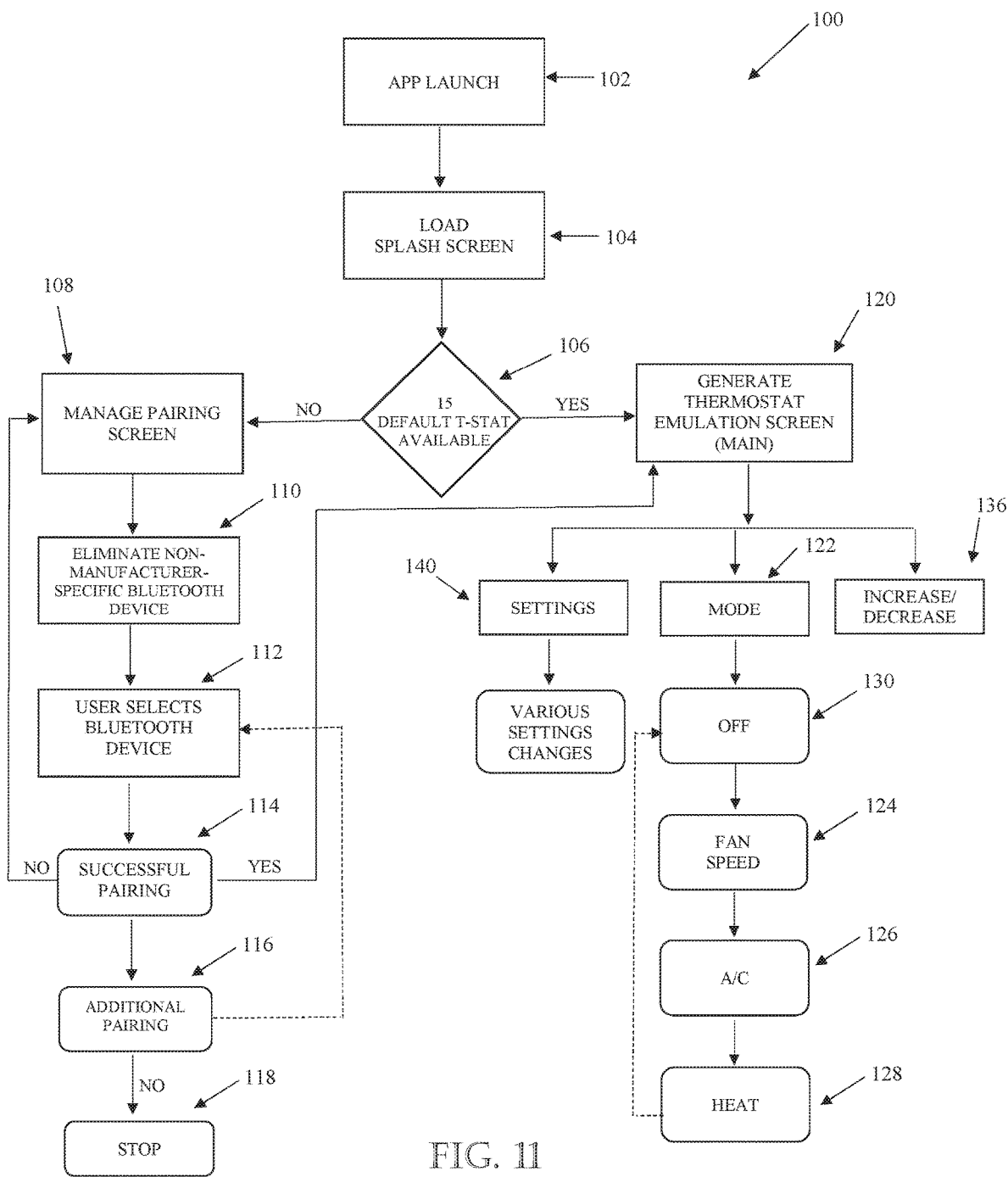

Referring now to FIG. 11, a flow chart is shown depicting a method of operation. This is one example of a method which may be used but others may be utilized. The method 100 begins by launching an app at step 102 on the smart device 30 (FIG. 4). When the app 50 is launched the splash screen 52 is loaded at step 104. One non-limiting example of a splash screen is shown at FIG. 4.

After the splash screen 52 is loaded, the application 50 checks for available thermostats 24 for connection at step 106. In doing this checking, if an available Bluetooth thermostat from a specific manufacturer is found, the application 50 next moves to a pairing screen 54 at step 108 for management of pairing. One example of a pairing screen is shown at FIG. 5. In moving to the pairing screen at step 108, a list of available Bluetooth devices from a specific manufacturer may be shown. As depicted in FIG. 5, a one or more thermostats may be shown as available in the form of the list 58. In preparing this listing at step 110, the app 50 will eliminate any non-manufacturer specific Bluetooth devices. This means that any devices which are not from a preselected or specific manufacturer are eliminated from the list and not shown to a user. Alternatively, if multiple Bluetooth devices, for example thermostats, are available to the app and from a specific pre-selected manufacturer, all of these may be shown at the pairing screen depicted in FIG. 5.

Next, a user selects a Bluetooth device desired at step 112. When this occurs, the app checks whether there is a successful pairing at step 114. If there is not a successful pairing process, the app 50 may return back to the pairing screen shown in FIG. 5 and step 108 of the method 100. Alternatively, if the pairing is successful at step 114, the method 100 next moves to a thermostat emulation screen, one of which is shown at FIG. 6. Further, from this pairing step 114, the app 50 may determine if there are additional pairings necessary, for example, if there are further Bluetooth connections available after the first one is selected. This occurs at step 116. This may be useful in the situation where multiple HVACs 22 and thermostats 24 are utilized, for example in the vehicle depicted in FIG. 1. If the additional pairings are available, the application 50 may return to the step 112 and allow the user to select a Bluetooth device. If no additional pairings are available, this portion of the method 100 stops at step 118.

As previously described after a successful pairing at step 114, a thermostat emulation screen, or main screen, is provided at step 120. From this thermostat emulation screen, which looks substantially similar to the screen 40 of the thermostat 24 (FIG. 3), various modes may be selected or various operating characteristics may be changed. At the emulation screen 140 (FIG. 6), the mode button and the first area 142 (FIG. 6) may be selected to change from an off mode at step 122 to a fan speed mode at step 124. By depressing the mode virtual button again, the mode may be changed to an air conditioning mode at step 126. Further, by pressing the mode button again, the mode may be changed to a heating mode at step 128. Finally, if the mode button is pressed yet again, the system cycles back to an off mode at step 130.

From any of the modes 124, 126, 128, the operating characteristics within that mode may be adjusted by increasing or decreasing at step 136. For example, in the fan speed mode at step 124, increasing or decreasing the fan speed is possible utilizing the second and third areas 143, 144 (FIG. 6). Similarly, in the air conditioning mode at step 126, the increasing and decreasing steps at 136 may increase or decrease the set temperature for the HVAC system 22. Further, in the heating mode at step 128, increasing or decreasing at step 136 may increase or decrease the set temperature for the HVAC system 22.

Further, from the thermostat emulation screen at step 120, a settings virtual button may be depressed at step 140. This may provide access to a plurality of settings, several of which are shown in FIG. 10 at step 142. These include, but are not limited to, changing the name of a Bluetooth connected thermostat, changing the settings from Fahrenheit to Celsius or vice versa, disconnecting the smart device 30 from the thermostat 24, or canceling or exiting the settings mode of step 140.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A method of controlling a mobile climate control system, comprising the steps of:
   powering on a smart device having an application for controlling said mobile climate control system, said mobile climate control system for heating or cooling a recreational vehicle, said mobile climate control system being disposed at least partially on an exterior of said recreational vehicle;
   starting said application on said smart device, said smart device having a Bluetooth transceiver;
   starting communication capability of said Bluetooth transceiver of said smart device;
   connecting said smart device to a thermostat which is in communication with said mobile climate control system, said thermostat having a thermostat Bluetooth transceiver, and eliminating non-manufacturer specific Bluetooth connections;
   providing at least one screen on said application which substantially emulates by substantially replicating a control screen of said thermostat for control of said mobile climate control system; and,
   setting at least one control characteristic on said at least one screen on said smart device, wherein said mobile climate control system is solely controlled by said thermostat or said smart device.

2. The method of claim 1, said connecting including the step of selecting at least one manufacturer-specific mobile climate control system.

3. The method of claim 2, said connecting being a direct connection between said smart device and said transceiver of said thermostat without an intermediary communication device.

4. The method of claim 2, said connecting occurring from said application.

5. The method of claim 1, said setting including powering on or off said mobile climate control system.

6. The method of claim 1, said setting including selecting one of air-conditioning or heating.

7. The method of claim 1, said setting including selecting of a fan speed or an automatic setting.

8. The method of claim 1, said setting including selecting a set temperature.

9. The method of claim 1 further comprising displaying a temperature of said recreational vehicle interior wherein said thermostat is located.

10. The method of claim 1 further comprising measuring a temperature of said recreational vehicle interior at said thermostat and displaying said temperature on said application of said smart device.

11. The method of claim 1, further comprising loading a splash screen when said application starts.

12. The method of claim 1 further comprising providing a virtual menu button on said at least one screen which substantially emulates a control screen of said thermostat.

13. The method of claim 1 further comprising displaying a name of said thermostat on said at least one screen which substantially emulates a control screen of said thermostat.

14. The method of claim 1 further comprising providing multiple virtual buttons on said at least one screen which substantially emulates a control screen of said thermostat.

15. The method of claim 14 wherein one of said multiple virtual buttons is a mode button to change between heating, air-conditioning, fan operation and an off condition.

16. The method of claim 1 further comprising displaying an instruction screen which prompts a user to cycle said thermostat to connect said smart device and said thermostat.

17. The method of claim 1 said application providing a screen to manage multiple Bluetooth connected thermostats.

18. The method of claim 17, said screen to manage multiple Bluetooth connected thermostats application providing a virtual button for each detected thermostat.

19. A method of controlling a mobile climate control system, comprising the steps of:
receiving an input on an application of a smart device to establish a connection between said smart device and said mobile climate control system of a recreational vehicle, said mobile climate control system at least partially disposed on an exterior of the recreational vehicle;
establishing a Bluetooth communication connection, within said application, between a thermostat of said mobile climate control system and said smart device;
providing a smart device screen which emulates by substantially replicating an appearance of said thermostat of said mobile climate control system;
receiving a user input at said smart device screen which emulates by substantially replicating an appearance of said thermostat;
sending a signal corresponding to said input to said thermostat to change a control characteristic;
wherein said thermostat solely receives remote input from said smart device via said Bluetooth communication connection.

20. The method of claim 19, further comprising eliminating non-manufacturer specific selections from a Bluetooth pairing screen.

21. The method of claim 19, said establishing a connection being with a Bluetooth transceiver in said thermostat.

22. The method of claim 19, said thermostat communicating with a relay of said mobile climate control system.

23. The method of claim 19 further comprising displaying a temperature setting and a mode setting.

24. The method of claim 23, said user input being one of mode setting, or temperature set point.

25. The method of claim 24, said mode setting being one of air-conditioning, heat, fan operation or an off condition.

26. The method of claim 19, receiving input to disconnect said Bluetooth communication connection.

27. The method of claim 19, further comprising displaying a splash screen.

28. The method of claim 19, determining if a default known thermostat is available for connection.

29. The method of claim 28 further comprising displaying a Bluetooth pairing screen.

30. The method of claim 29 determining if said establishing a connection is successful.

31. The method of claim 30 further comprising returning to said Bluetooth pairing screen if said connection is unsuccessful.

32. The method of claim 30 further comprising displaying said smart device screen which emulates an appearance of a thermostat of said mobile climate control system, if said connection is successful.

33. The method of claim 19, further comprising the step of receiving input to label one or more mobile climate control systems.

34. A system of controlling a mobile climate control, comprising:
a recreational vehicle (RV);
a mobile air conditioner which cools said RV, said mobile air conditioner at least partially disposed exterior to said RV;
a thermostat disposed in said RV and in communication with said mobile air conditioner;
a Bluetooth receiver disposed in said thermostat;
a smart device in wireless Bluetooth communication with said Bluetooth receiver of said thermostat, said smart device being the sole input provider to the thermostat other than the thermostat;
wherein said smart device emulates a face of said thermostat in order to be utilized to control and change settings of said thermostat.

* * * * *